Sept. 26, 1944.  E. L. KENT  2,358,980
PROTECTIVE DEVICE FOR INDICATING INSTRUMENTS
Filed March 25, 1943
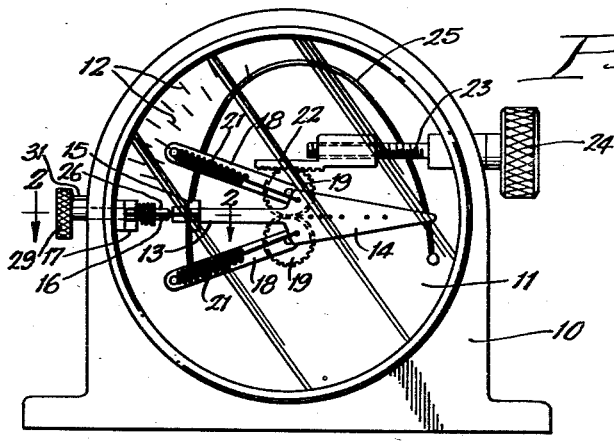
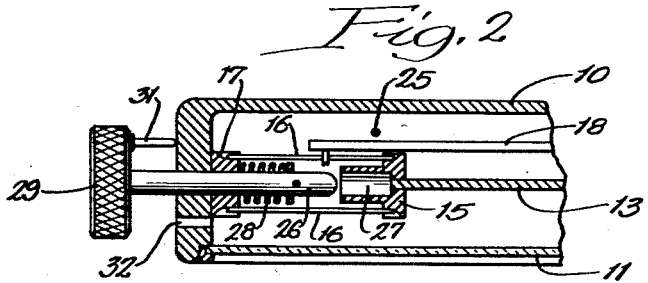
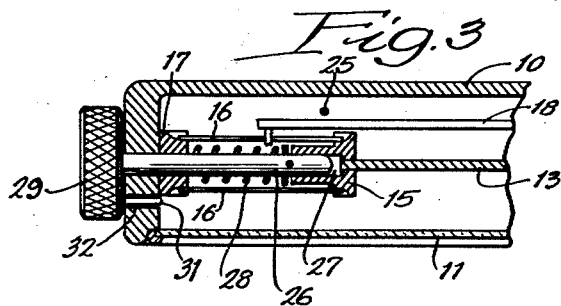
Inventor:
Earle L. Kent,
By Dawson, Ooms and Birth.
Attorneys.

Patented Sept. 26, 1944

2,358,980

UNITED STATES PATENT OFFICE 2,358,980

PROTECTIVE DEVICE FOR INDICATING INSTRUMENTS

Earle L. Kent, Elkhart, Ind., assignor to C. G. Conn, Ltd., Elkhart, Ind., a corporation of Indiana Application March 25, 1943, Serial No. 480,501

6 Claims. (Cl. 73—67)

This invention relates to indicating instruments and more particularly to a construction for protecting such instruments during shipment and handling.

In instruments having movably mounted operating or indicating levers or pointers such elements frequently become damaged during shipment and handling of the instrument and it is one of the objects of the present invention to provide a construction for locking the parts of such instruments against movement to prevent damage thereto.

Another object of the invention is to provide an indicating instrument including a resiliently mounted lever in which the lever may be locked against motion in any direction.

Still another object of the invention is to provide an indicating instrument including operating parts geared together in which resilient means are provided to hold the parts against accidental movement due to lost motion in the gearing.

The above and other objects and advantages of the invention will be more readily apparent from the following description when read in connection with the accompanying drawing, in which—

Figure 1 is a front elevation of an instrument embodying the invention; and

Figures 2 and 3 are partial sections on line 2—2 of Figure 1 showing the parts in a different position.

The instrument illustrated is particularly adapted to measure the frequency and amplitude of vibrations and is of the type more particularly described and claimed in my copending application, Serial No. 464,130, filed October 31, 1942, now Patent No. 2,343,063, dated February 29, 1944. As shown, the instrument comprises a casing 10 which may be molded plastic or the like having a circular cavity therein. The front of the casing is closed by a transparent cover 11 on which calibrations may be marked as indicated at 12.

Within the casing there is movably mounted a lever 13 having an enlarged tapered end 14. The lever is suspended by means of a head 15 secured thereto and connected to one end of a pair of elongated spring strips 16. The opposite ends of the strips are connected to a block 17 secured to the inner wall of the casing. In this way the lever 13 is resiliently supported and will move in response to vibrations imparted to the casing by a vibrating body to be tested.

Motion of the lever is controlled by a pair of arms 18 secured to intermeshing gears 19 which are rotatably mounted on the casing wall. The arms carry springs 21 connected at their outer ends to pins on the arms and at their inner ends to the lever 13. The position of the arms is controlled by a rack 22 meshing with one of the gears 19 and moved by means of a screw 23 extending through the casing and having a knurled head 24 outside of the casing. As the head 24 is turned, the rack will turn the gears to move the arms in the opposite direction thereby varying the effect of the springs 21 on the lever so that its resonant frequency will be changed.

With a construction of this type, there is apt to be a certain amount of play or lost motion in the gearing and in order to eliminate undesired movement of the arms, due to such lost motion, an elongated spring strip 25 is connected at one end to the casing and at its opposite end to one of the arms. The spring exerts a constant biasing force on the arm tending to turn it in one direction so that any lost motion in the gearing will aways be taken up in the same direction and no undesired movement of the arms will occur. As shown, one of the arms moves under the scale 12 on the transparent cover 11 and the position thereof indicates on the scale the resonant frequency of the lever 13.

With this construction when the instrument is being handled or supported, the lever will vibrate in response to movement of the casing and is apt to damage the springs 16 or to become damaged itself. In order to eliminate this possibility, a locking plunger 26 is provided slidable through the casing wall and through the block 17. The end of the plunger is adapted to enter a bore or opening 27 in the head 15 and when in this position will securely hold the lever against movement in any direction. The plunger is urged into the bore by a coil spring 28 acting between the block 17 and a collar on the plunger and is adapted to be pulled out of the bore by a knurled head 29 carried by the plunger on the outside of the casing. When the head is pulled out to pull the plunger away from the bore it may be held in this position by a pin 31 carried by the head and engageable with the outer surface of the casing. The casing is formed with an opening 32 adapted to receive the pin 31 in one radial position to permit the plunger to move in response to the spring 28. Thus when it is desired to use the instrument, the plunger may be held out of the bore in the lever so that the lever is free to move in response to vibrations.

While one embodiment of the invention is shown and described in detail, it will be understood that this is illustrative only and is not intended as a definition of the scope of the invention, reference being had for this purpose to the appended claims.

What is claimed is:

1. In an indicating instrument, a casing, a lever in the casing, resilient means connecting the lever adjacent one end to the casing so that the lever can vibrate in the casing, the lever having an elongated opening in said end, and a locking plunger slidable through a wall of the casing to enter said opening and hold the lever against movement.

2. In an indicating instrument, a casing, a lever in the casing, resilient means connecting the lever adjacent one end to the casing, the lever having an elongated opening in said end, a locking plunger slidable through a wall of the casing, resilient means urging the locking plunger toward the lever whereby its end will enter the opening to hold the lever against movement, and means on the plunger operable at will to hold it away from the lever.

3. In an indicating instrument, a casing, a lever in the casing, a pair of elongated springs connected at one end to the casing and at the other end to the lever adjacent one end thereof, the springs lying on opposite sides of the lever and the lever having a longitudinal bore in the end to which the springs are attached, and a plunger slidable through the casing between the springs to enter the bore and hold the lever against movement.

4. In an indicating instrument, a casing, a lever in the casing, a pair of elongated springs connected at one end to the casing and at the other end to the lever adjacent one end thereof, the springs lying on opposite sides of the lever and the lever having a longitudinal bore in the end to which the springs are attached, a plunger slidable through the casing between the springs to enter the bore and hold the lever against movement, resilient means urging the plunger toward the bore, and means on the plunger to hold it away from the bore.

5. In an indicating instrument, a casing, a lever in the casing, a pair of elongated springs connected at one end to the casing and at the other end to the lever adjacent one end thereof, the springs lying on opposite sides of the lever and the lever having a bore in the end to which the springs are attached, a plunger slidable through the casing between the springs to enter the bore and hold the lever against movement, resilient means in the casing urging the plunger toward the bore, a head on the plunger outside of the casing, and a projection on the head adapted in one radial position to enter an opening in the casing whereby the plunger can move into the bore and in another radial position to engage the outer wall of the casing to hold the plunger away from the bore.

6. An indicating instrument for measuring mechanical vibrations comprising a hollow casing, a lever movably mounted in the casing to move in response to vibrations, a pair of arms pivotally mounted in the casing adjacent the lever, gearing connecting the arms to move them proportionately in opposite directions, resilient means connecting the arms to the lever to vary the resonant frequency thereof as the arms are moved, and a spring connected at one end to the casing and at its other end to one of the arms to urge the arms constantly in one direction so that the position of the arms will not change due to lost motion in the gearing.

EARLE L. KENT.